No. 673,868. Patented May 14, 1901.
J. C. HENDERSON.
FILTERING SYSTEM.
(Application filed May 4, 1900.)
(No Model.)

WITNESSES
J. S. Cadell
C. S. Rogers

INVENTOR
John C. Henderson
by James R. Rogers
ATTY

UNITED STATES PATENT OFFICE.

JOHN C. HENDERSON, OF NEW YORK, N. Y., ASSIGNOR TO THE MAIZE PRODUCTS COMPANY, OF SAME PLACE.

FILTERING SYSTEM.

SPECIFICATION forming part of Letters Patent No. 673,868, dated May 14, 1901.

Application filed May 4, 1900. Serial No. 15,515. (No model.)

*To all whom it may concern:*

Be it known that I, JOHN C. HENDERSON, a citizen of the United States, residing at New York, in the county of New York and State of New York, have invented certain new and useful Improvements in Filtering Systems; and I do hereby declare the following to be a full, clear, and exact description of the invention, such as will enable others skilled in the art to which it appertains to make and use the same.

This invention relates to improvements in systems for filtering material; and one of the objects of the invention is to provide an apparatus in which the supply or receiving tank for the material to be filtered is disposed or located above the level of the uppermost filter of the apparatus.

Another object of the invention is to provide a filtering apparatus embodying a series of separate or individual air-tight filters having suitable filtering material disposed therein.

A further object of the invention is to locate or dispose the storage tank or receptacle, into which the filtered material is deposited, in a plane below that of the lowermost filter; and it is also an object of this invention to provide a vacuum main or pipe connected with each of the filters of the apparatus by means of branch pipes and to connect said main with the supply-tank and storage-tank of the receptacle and to provide a vacuum-pump, connected with said main, to draw the material to be treated upwardly through the filtering material in each separate or individual filter throughout the system.

With these and other objects in view the invention consists, essentially, of the construction, combination, and arrangement of parts, substantially as hereinafter more fully described in the following specification and illustrated in the accompanying drawings, forming part of this application, in which—

Figure 1:
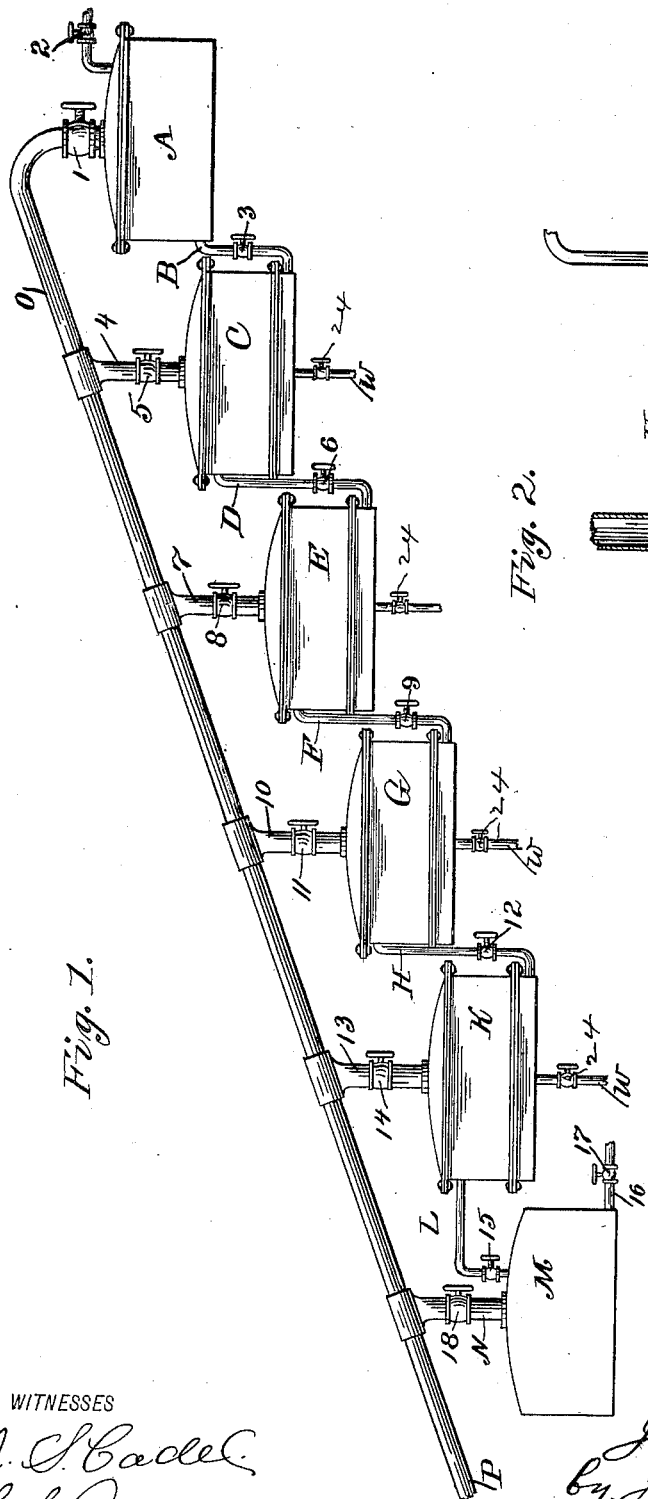
Figure 2:
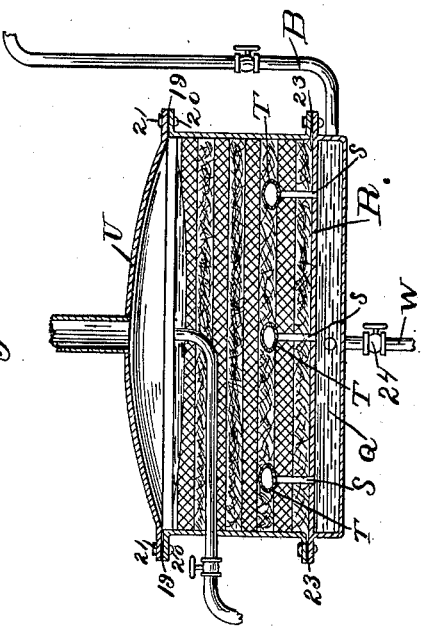
Figure 3:
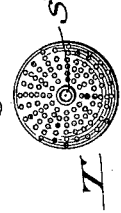

Figure 1 is a side elevational view of the apparatus, showing the separate filters, supply-tank, storage tank or receptacle, vacuum-main, and connection. Fig. 2 is a longitudinal central section through one of the separate filters; and Fig. 3 is a bottom plan view of one of the roses illustrated in Fig. 2 drawn upon an enlarged scale.

Similar characters of reference designate corresponding parts throughout the several views.

Referring to the drawings, the reference character A designates a tank or receptacle of any preferred construction, into which the material to be treated or filtered is introduced and from which the same is supplied to the apparatus, and this supply-tank A is preferably provided with a removable top or cover, with which is connected the vacuum-main O, preferably provided with a cut-off or valve 1, and the tank A is desirably provided with a supply-pipe of any formation, having a cut-off or valve 2, substantially as shown in Fig. 1 of the drawings.

It will be understood that the end P of the vacuum-main O is to be connected with a vacuum-pump (not shown) or other similar apparatus, the construction whereof will be determined in practice for the purpose of exhausting the air from the supply-tank A, the separate filters, and the storage tank or receptacle M, as hereinafter more fully described.

A storage tank or receptacle M of any desired form or construction is preferably connected with the vacuum-main O by branch pipe or connection N, desirably having a cut-off or valve 18, and this receptacle may also be provided with an outlet-pipe 16, having a cut-off or valve 17, and this pipe is designed to furnish means for withdrawing the purified or filtered material after the same has passed through the separate filters of the apparatus.

Any number of separate or independent filters may be employed that may be required in practice; but the same are preferably similar in construction and operation, and it will therefore only be necessary to describe the construction of one of said separate filters in order to secure an understanding of the invention herein described and shown.

Referring particularly to the construction illustrated in Fig. 2 of the drawings, the filter therein shown is preferably constructed of the cylindrical main or body portion having laterally-extending end flanges and a top or cover U, desirably provided with a flange, which may be bolted or otherwise secured to one of the end flanges of said main or body portion, as by bolts and nuts 20 and 21, and, if desired, packing or other material 19 may be placed between said flanges to produce a tight joint or connection.

The bottom portion of the filter is preferably constructed with a space or chamber Q, above which is a partition or head R, provided, preferably, with any number of vertical pipes or risers S, with the upper portion whereof may be connected bulbs or roses T, desirably provided with a number of openings upon the under side thereof around the connection of the risers therewith, and the bottom portion of the filter may be provided with an annular flange constructed to be bolted or otherwise secured to the end flange of the main or body portion of the filter, and packing or other material 23 may be secured between said flanges to produce a tight joint.

If desired, an induction-pipe W may be suitably connected with the chamber Q of the bottom portion of the filter to afford means for the introduction of decolorizing or bleaching gas or other agent, such as sulfurous-acid gas, through the filters, the supply-tank A, and the receptacle M in order to thoroughly bleach or decolorize the material which has not been completed for use by the action of a separate filter, and this tank may be provided with a cut-off or valve 24, substantially as shown in Fig. 2 of the drawings.

Each of the filters is provided with an overflow-pipe, preferably constructed to withdraw the material filtered or treated from the top or upper portion of each filter and introduce the same into the lower portion of chamber Q of the succeeding filter, and each of these pipes is provided with a cut-off pipe or valve, as shown.

The supply-tank A is provided with an outlet-pipe B, having a valve or cut-off 3, which preferably connects with the lower portion or chamber Q, as shown in Fig. 2 of the drawings, and the filter K is provided with an overflow-pipe L, having a cut-off or valve 15 communicating with the upper portion of the receptacle A, substantially as shown in the drawings.

Any suitable filtering material may be secured within the separate filters as may be found suitable in practice.

The operation of the invention will be understood from the foregoing description when taken in connection with the accompanying drawings and the following explanation thereof.

The material to be treated or filtered is introduced into the supply-tank A through the supply-pipe, valves 5, 8, 11, 14, and 18 are opened, and the air is exhausted from the filters C E G K and from the receptacle M by means of a pump (not shown) attached to the pipe P, and the material is thereby caused to pass from the supply-tank A to the bottom of each filter in succession up through the filtering material therein until the material shall have reached the receptacle M, from whence the same may be removed through the pipe 16, or the process may be reversed and the material may be forced backwardly or upwardly through the filters to the supply-tank, if desired.

I do not desire to confine myself to the specific construction, combination, and arrangement of parts herein shown and described, and I therefore reserve the right to make all such changes in and modifications of the same as come within the spirit and scope of my invention.

What I claim is—

1. A filtering apparatus, provided with a plurality of separate filters, means for connecting together the filters, the said filters arranged with the bottom of the highest filter on a level with the top of the next adjacent filter, and means for creating a vacuum connected with each filter to permit the material to be treated to rise upwardly through each of the said filters.

2. A filtering apparatus, provided with a plurality of separate filters, means for connecting together the filters, said filters arranged with the bottom of the highest filter in the series on a level with the top of the next adjacent filter, and a vacuum-pump to draw the material from the bottom upward through each successive filter.

3. A filtering apparatus, provided with a plurality of separate filters, the said filters arranged with the bottom of the next higher filter in the series on a level with the top of the next adjacent lower filter in said series, a supply-tank, and means connected with the latter and with the said filters to draw the material treated through each separate filter in an upward direction in succession.

4. A filtering apparatus, provided with a supply and receiving tank, separate filters arranged with the bottom of the next higher filter in the series on a level with the top of the next adjacent lower filter in said series, and means connected with said tanks and filters to drawn the material treated from the bottom to the top of each of said filters in succession.

5. A filtering apparatus provided with separate filters, a supply and receiving tank, connections between said tanks and filters and means connected with said tank and filters for withdrawing the material treated from the bottom through said filters in succession.

6. A filtering apparatus provided with separate filters, connections between the latter and with the source of supply and means for forcing a bleaching agent through the material in said filters.

7. A filtering apparatus provided with separate filters, connections between the latter and with the source of supply means for forcing a bleaching agent through the material in said filters and an instrumentality for withdrawing the material treated from the bottom through each separate filter in succession.

8. A filter provided with a chambered bottom having discharging devices connected therewith, filtering material in said filter and means for withdrawing the treated material from the bottom through said devices and material.

9. A filter provided with a chamber-bottom whereinto the material treated is introduced, discharging devices connected therewith, filtering material in said filter means for withdrawing the air from said filter and means for conveying the treated material drawn from the bottom to the top of said filter.

In testimony whereof I have hereunto affixed my signature in presence of two witnesses.

JOHN C. HENDERSON.

Witnesses:
JOHN J. ROSE,
ALEXIS C. MCNULTY.